United States Patent [19]

Sazaki

[11] Patent Number: 4,480,803
[45] Date of Patent: Nov. 6, 1984

[54] FISHING SPINNING REELS
[75] Inventor: Kounin Sazaki, Fukuyama, Japan
[73] Assignee: Ryobi Limited, Hiroshima, Japan
[21] Appl. No.: 401,862
[22] Filed: Jul. 26, 1982
[30] Foreign Application Priority Data Jul. 28, 1981 [JP] Japan .......................... 56-112826[U]

[51] Int. Cl.³ ............................................ A01K 89/01
[52] U.S. Cl. ............................................. 242/84.2 G
[58] Field of Search .................. 242/84.2 G, 84.21 R, 242/84.2 F

[56] References Cited
U.S. PATENT DOCUMENTS

| | | | |
|---|---|---|---|
| 2,966,314 | 12/1960 | Mombur | 242/84.21 R |
| 4,098,473 | 7/1978 | Sazaki | 242/84.2 G |
| 4,114,825 | 9/1978 | Murvall | 242/84.21 R |
| 4,147,313 | 4/1979 | Sazaki | 242/84.2 G |
| 4,238,085 | 12/1980 | Jansson et al. | 242/84.21 R |
| 4,256,271 | 3/1981 | Ruin | 242/84.2 G |
| 4,389,027 | 6/1983 | Sazaki et al. | 242/84.2 G |

FOREIGN PATENT DOCUMENTS 427747 11/1947 Italy .............................. 242/84.21 R Primary Examiner—Stuart S. Levy
Assistant Examiner—Joseph J. Hail, III
Attorney, Agent, or Firm—Frishauf, Holtz, Goodman & Woodward

[57] ABSTRACT

A fishing spinning reel in which a kick lever is slidably mounted on one of a pair of arms formed on a periphery of a rotor at diametrically opposing positions and being slideable in response to rotation of a rotor. The sliding movement of the kick lever is transferred to a spring-biased bail arm to rotate it through a swingable link lever and a connecting lever. The swingable link lever and the connecting lever are used to amplify the stroke of the movement of the kick lever, thereby turning the bail arm over a large angle.

2 Claims, 3 Drawing Figures

FISHING SPINNING REELS

BACKGROUND OF THE INVENTION

This invention relates to a fishing spinning reel and, more particularly to a bail arm reversing mechanism thereof.

A prior art bail arm reversing mechanism such as disclosed in U.S. Pat. Nos. 4,098,473 and 4,147,313 is constructed such that the bail arm is automatically reversed by the movement of the kick lever which is directly connected to the bail arm lever or the bail arm cam.

However, in the prior art construction, the reverse rotation angle of the bail arm is 35°–45°, which is small to precisely turn the bail arm so that the bail arm sometimes unexpectedly turns at the time of throwing the line, which results in cutting-off the line or shortening the throwing distance. Moreover, in order to avoid such deficiency, it is required to make the parts with a high precision, which raises the cost.

SUMMARY OF THE INVENTION

It is, therefore, an object of this invention to provide an improved spinning reel capable of turning the bail arm at a large angle with a compact and light-weight construction.

According to the invention, there is provided a fishing spinning reel comprising: a main body of a reel; a rotor supported by said main body and provided with a pair of arms formed on a periphery of said rotor at diametrically opposing positions; a bail arm lever and a pivot cam mounted on said pair of arms respectively; a spring-biased bail arm having both ends secured to said bail arm lever and pivot cam; a kick lever slidably mounted on one of said arms and slid in response to the rotation of said rotor; a link lever pivotably supported on said one of said arms and swung in response to the movement of said kick lever; and a connecting lever pivotably connected to said link lever and one of said bail arm lever and pivot cam; the amount of the movement of said connecting lever being in predetermined proportion to that of said kick lever.

DESCRIPTION OF THE PREFERRED EMBODIMENT

Figure 1:
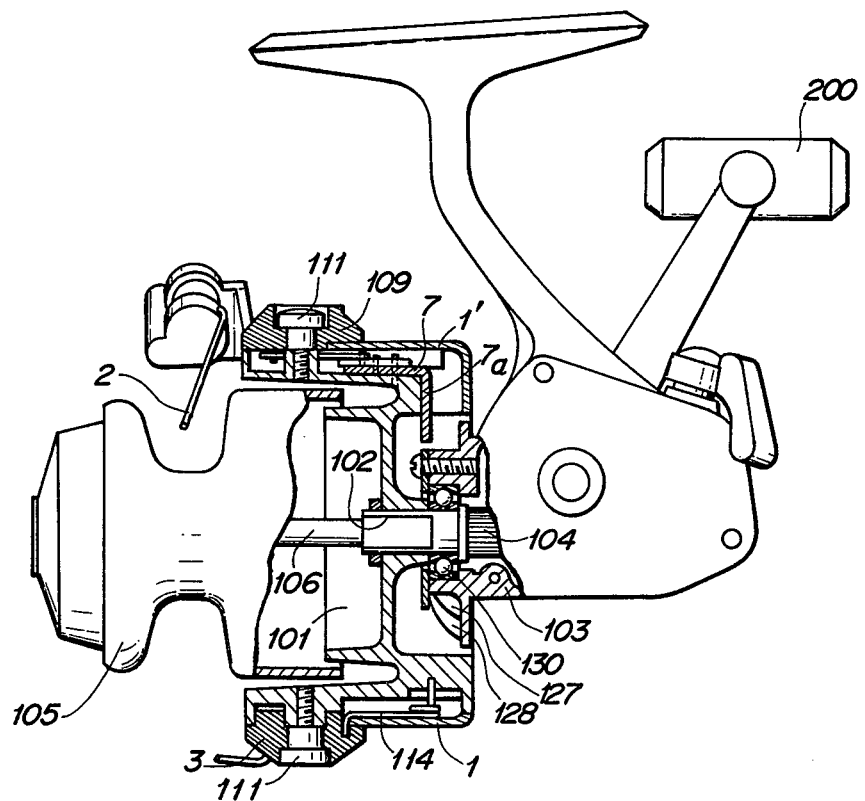
FIG. 1 shows a side view, partly in cross section of a fishing spinning reel embodying the invention.

As shown in FIG. 1, a pair of arms 1 and 1' are oppositely disposed at both sides of a rotor 101, which is mounted through a bearing 130 on a tubular shaft 102 to a reel body 103. The shaft 102 has a pinion 104 at one end and is rotated by a handle 200 coupled thereto by a main gear, not shown. A reciprocable spool 105 is detachably supported by a main shaft 106 inserted into the tubular shaft 102. A bail arm 2 is secured to a bail arm lever 109 at one end and to a pivot cam 3 at the other end, both of which are respectively shouldered on the arms 1 and 1' by step screws 111. A bail arm turning spring 114, one end of which is connected to the pivot cam 3 while the other end of which is connected to the bottom wall of the arm 1, biases the pivot cam 3 selectively toward its line-casting and rewinding positions since the dead point of the spring 114 is set between those two positions.

One end of a connecting lever 10 is pivotally mounted on the bail arm lever 109 by a pin 12 while other end is pivoted on a pin 11 located at one end of a link lever 8. The link lever 8 is swingably supported by a pin 9 on the bottom wall of the arm 1. Into a heart-shaped cam slot 13 formed on the link lever 8 is projected a pin 14 carried by the front end of one leg of an L-shaped kick lever 7. Both sides of this leg of the kick lever 7 are guided by an opposed pair of guide grooves 1b and 1b to slide in the lateral direction therealong. The other leg 7a of the kick lever 7 has an arcuate cross-section and the front end therof is positioned in the rotational locus of a key plate 127 secured to the main body 103. Thus, the kick lever 7 is urged to slide in the left direction in FIG. 2 by rotating the rotor 101 to cause abutment between the arcuate portion 7a and an inclined surface 128 of the key plate 127.

A pair of stoppers 160 and 161 are provided on the bottom wall of the arm 1 to engage a boss 5 projected inwardly at the inner surface of the bail arm lever 109 so as to hold it in its line-casting and rewinding positions respectively against the biasing force of the spring 114.

Figure 3:
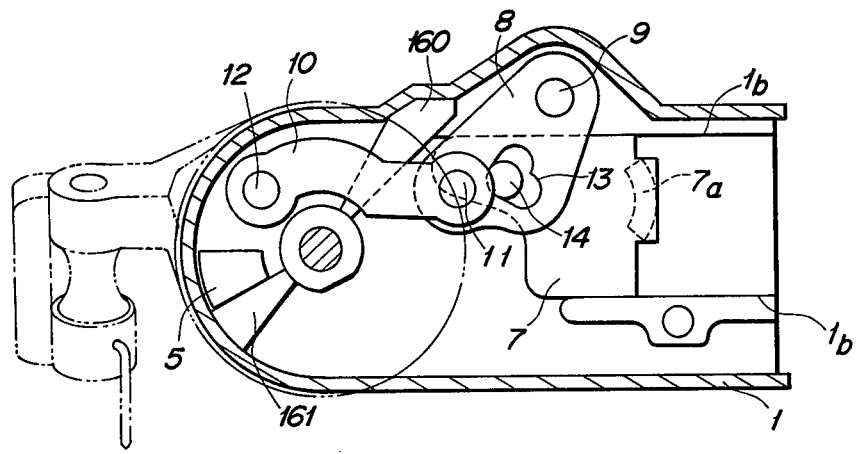
FIGS. 2 and 3 are enlarged explanatory plan views of the bail arm reversing mechanism in its casting and rewinding states, respectively.
Figure 2:
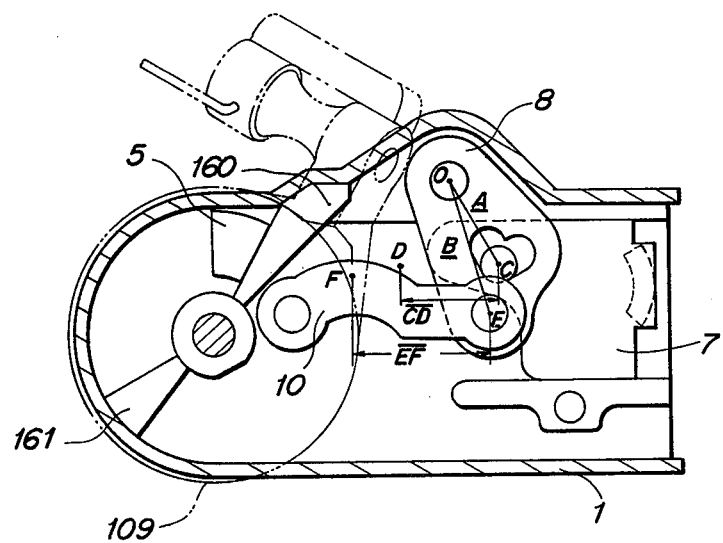

With the structure as above explained, when the bail arm lever 109 is rotated in the clockwise direction in the line-rewinding state shown in FIG. 3 and the dead point of the spring 114 is exceeded, the bail arm lever 109 is turned to by the biasing force of the spring 114 and held in its line-casting position as shown in FIG. 2. At this time, the connecting lever 10 is moved by the pin 12 in the right direction in FIG. 3 upon the rotation of the bail arm lever 109 so that the link lever 8 swings about the pin 9 and the kick lever 7 is slid along the pair of grooves 1b and 1b as the pin 14 thereof is guided by the inner periphery of the heart-shaped cam slot 13 of the link lever 8, thereby facing the front end of the arcuate portion 7a of the kick lever 7 to the inclined surface 128 of the key plate 127, as shown in FIGS. 1 and 2.

On the contrary, when the handle 200 is rotated in the line-casting position, the inclined surface 128 of the key plate 127 pushes the front end of the arcuate portion 7a of the kick lever 7 so that it slides in the left direction in FIG. 2 and the connecting lever 10 turns the bail arm lever 109 in the counter-clockwise direction. When the bail arm lever 109 exceeds the dead point of the spring 114, then it is rotated by the biasing force of the spring 114 and held at its line-rewinding position by the stopper 161.

In this situation, the distance $\underline{A}$ between the pivot point O of the link lever 8 and the point C of the kick lever 7 is designed to be shorter than the distance $\underline{B}$ between the pivot points $\underline{E}$ of the connecting lever $\overline{10}$ and O so that the stroke $\overline{CD}$ of the kick lever 7 is to be shorter than the stroke $\overline{EF}$ of the connecting lever 10 so that the rotation angle of the bail arm 2 is larger than 45°. The proportion of the distances $\underline{A}$ and $\underline{B}$ and accordingly of the stroke $\overline{CD}$ and $\overline{EF}$ may be desirably predetermined. This means, in other words, that the stroke of the kick lever 7 can be decreased to get a desired certain angle of the rotation of the bail arm 2.

The full turning movement of the bail arm 2, from the position shown in FIG. 2, is prevented by the engagement of the pin 14 of the kick lever 7 with the right side inner periphery of the heart-shaped slot 13 during the line-casting operation except when the handle is rotated.

The bail arm turning spring 114 mounted on arm 1 carrying the pivot cam 3 may be arranged in the arm 1' carrying the bail arm lever 109 together with other elements of the bail arm reversing mechanism, and the elements arranged in the arm 1' may, then, be mounted on the arm 1.

As described hereinabove, according to the fishing spinning reel embodying the invention, since the link lever 8 and the connecting lever 10 amplify the amount of the movement of the kick lever 7, large angle rotation of the bail arm 2 can be obtained without increasing the sliding stroke of the kick lever 7. Further, the construction of the arm 1' and so the reel itself can be as compact and light-weight as possible. Moreover, precise reversing of the bail arm 2 is guaranteed without utilizing expensive parts regardless of the elastic weariness of the bail arm turning spring 114 and the deformation of the bail arm 2 often happening during operation and causing unpreparedly turning of the bail arm 2.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A fishing spinning reel comprising:
   a main body of a reel;
   a rotor supported by said main body and provided with a pair of arms formed on a periphery of said rotor at diametrically opposing positions;
   a bail arm lever and a pivot cam mounted on said pair of arms of said rotor, respectively;
   a spring-biased bail arm having two ends, one end thereof being secured to said bail arm lever and another end thereof being secured to said pivot cam;
   a kick lever slidably mounted on one of said pair of arms of said rotor and being slideable in response to rotation of said rotor;
   a link lever pivotably supported on said one of said pair of arms and being swingable about its pivot support in response to sliding movement of said kick lever;
   a heart-shaped cam slot having two lobes formed on said link lever;
   a pin projecting from the end of said kick lever and projecting into said cam slot and said pin being guided by the inner periphery of said cam slot, said pin entering one lobe of the heart-shaped cam slot upon the sliding movement of said kick lever between a line casting position and a line winding position, and said pin entering the other lobe of said heart-shaped cam slot upon rotation of said bail arm lever when the reel is in the line casting position thereby preventing the premature return to the line winding position; and
   a connecting lever pivotably connected to said link lever and to one of said pivot cam and bail arm lever, the amount of movement of said connecting lever being in predetermined proportion to that of said kick lever.

2. The fishing spinning reel according to claim 1 comprising a key plate secured to said main body, and wherein said kick lever is generally L-shaped, one leg of said L-shaped kick lever having an arcuate cross-section and arranged to face said key plate secured to said main body.

* * * * *